United States Patent [19]
Wilson

[11] 3,738,214
[45] June 12, 1973

[54] RADIAL ARM SAW
[76] Inventor: Neill R. Wilson, Box 538, Berryville, Va. 22611
[22] Filed: May 18, 1970
[21] Appl. No.: 38,034

[52] U.S. Cl. ............... 83/761, 144/134 B, 144/1 R
[51] Int. Cl. ...................... B27b 5/20, B27b 27/06
[58] Field of Search .................... 143/6, 6 A, 6 G, 143/7, 47 F, 47; 144/134 B, 134 C, 136, 1 R, 134

[56] References Cited
UNITED STATES PATENTS
| | | | |
|---|---|---|---|
| 2,722,952 | 11/1955 | Snyder | 143/6 A |
| 3,080,897 | 3/1963 | Winter | 143/7 |
| 2,987,083 | 6/1961 | Ross et al. | 143/6 A |
| 3,007,499 | 11/1961 | Dobslaw | 143/6 A |

Primary Examiner—Donald R. Schran
Attorney—William A. Strauch, James E. Nolan, J. Matthews Neale et al.

[57] ABSTRACT

A radial arm saw capable of use with various type portable saws such as saber saws, routers, circular saws, etc. for providing linear cuts and circular cuts of varying diameter. The radial arm saw includes a support column, a transverse arm rotatably mounted at one end on the upper column and rotatably supporting at its other end a trackway on which a carriage assembly has relatively rotatable upper and lower portions, the latter of which supports a tool holding frame adjustable in size to accommodate various type tools and provide circular cuts of varying diameters. In addition, the tool frame is linearly adjustable to the carriage assembly to provide a straight cut as desired.

19 Claims, 5 Drawing Figures

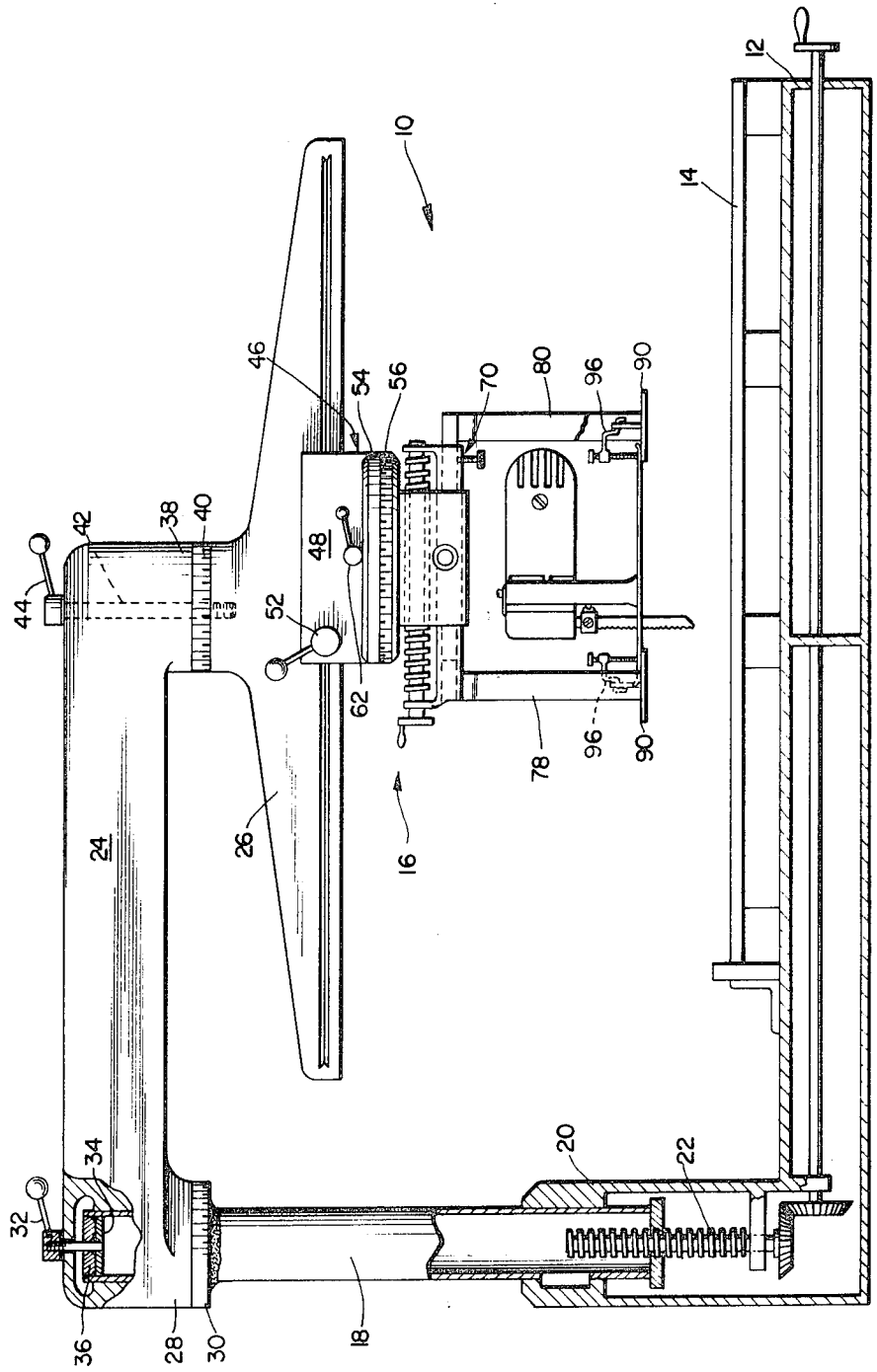

PATENTED JUN 12 1973 3,738,214
SHEET 2 OF 2
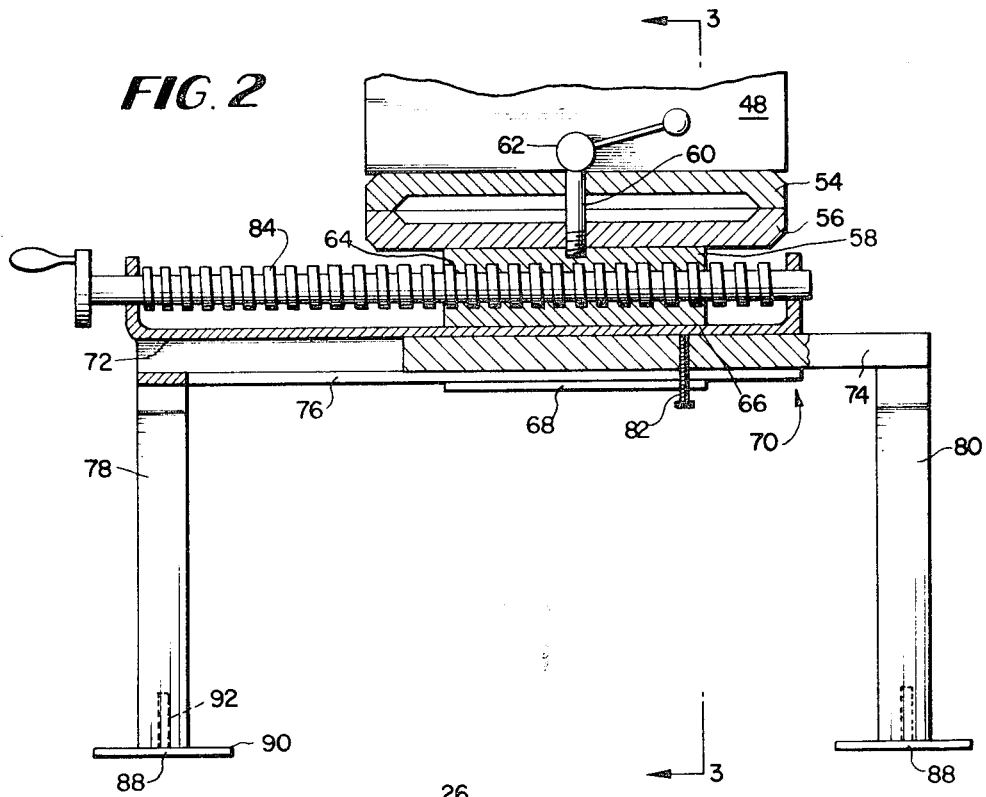
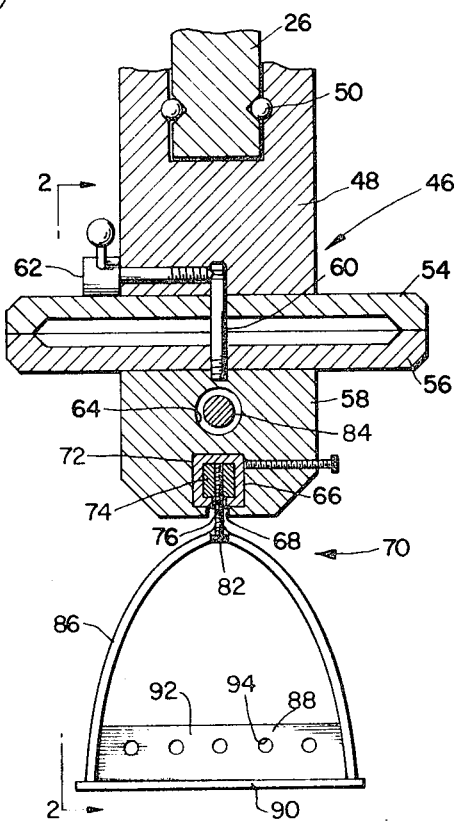
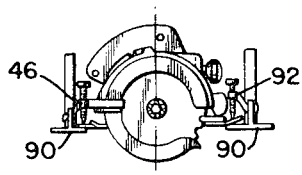
INVENTOR
NEILL R. WILSON 3,738,214

RADIAL ARM SAW

BACKGROUND OF THE INVENTION

This invention relates to machines that are commonly called "radial arm saws." Machines of this type normally have a vertical column, an arm supported by the column and angularly movable about the column in a horizontal plane, a carriage supported by the arm in such a manner as to be movable along the arm and a motor driven tool supported by the carriage and movable therewith.

SUMMARY OF THE INVENTION

The broad object of this invention is the provision of a radial arm type sawing or cutting machine which is especially designed for use in connection with portable motor driven saws, or routers for crosscutting, ripping, mitering, routing and various other wood as well as metal working operations. Such operations being accomplished in a particularly efficient and accurate manner.

An object of this invention is to provide a radial arm machine which is capable of utilizing the sabre type portable saw and the portable router as well as the circular type saw and is capable of holding the power tool in such a manner that the tool may be moved into the work while the work is held stationary or the work moved into the tool while the tool is held stationary.

A still further object of this invention is the provision of means for accomplishing circular cuts with the sabre saw or router by providing means for locking the saw or router with respect to the carriage and also locking the carriage with respect to the arm while allowing the arm to swing about its pivot during the cutting operation. Circular cuts of smaller diameter may also be accomplished by the provision of means for allowing the saw or router to swing or rotate during cutting about the center of the carriage while the carriage is locked to the arm and the arm is locked to the column.

A still further object of this invention is the provision of means for linearly moving the tool with respect to the carriage before or during the cutting operation, thus allowing the radius of small diameter circular cuts to be adjusted as well as providing a means for making linear cuts at any chosen angle with respect to the arm.

A still further object of this invention is the provision fo an offset column which allows the work to be placed under and beyond the axis of rotation of the arm, thus substantially increasing the ripping capacity of the machine as well as allowing the cutting of large circular work pieces.

BRIEF DESCRIPTION OF DRAWINGS

FIG. 1 is a partially sectioned front elevation view of the radial arm saw of the invention with a conventional portable saber saw mounted thereon for usage therewith;

FIG. 2 is an enlarged fragmentary partially sectioned view taken generally in the direction of line 2—2 of FIG. 3 and illustrating the tool holding frame and manner in which it is movably mounted on the carriage assembly;

FIG. 3 is a sectional view taken along line 3—3 of FIG. 2;

FIG. 4 is a fragmentary view illustrating a conventional portable circular saw mounted on the machine of FIG. 1;

FIG. 5 is a fragmentary view of a conventional portable router mounted on the machine of FIG. 1.

DETAILED DESCRIPTION OF PREFERRED EMBODIMENT

Referring now to the drawings, the radial arm saw 10 comprises support bar 12 on which a work table 14 is mounted and a carriage and tool holder assembly 16 supported in operative working association above table 14. The carriage and tool holder support includes a vertical tubular column 18 axially slidable in tubular post 20 by movement of a handcrank screw mechanism 22, a horizontal transverse support arm 24 rotatably mounted at one end on the upper end of column 18 and having its outer end capable of extending over the geometrical center of table 14, and an elongated horizontal trackway 26 journalled on the outer end of arm 24, with assembly 16 being reciprocable along trackway 26.

Arm 24 has a bearing mounted pad 28 which rests on a mating bearing pad 30 welded on column 18, and once the arm is rotatably adjusted in a desired position over table 14, it is locked in place by rotation of lever 32 which draws plate 34 tightly up against plate 36 welded in the upper end of column 18.

Similarly arm 24 has at its outer end a cylindrical mounting pad 38 cooperating with a mating cylindrical mounting pad 40 on trackway 26, with a coaxial journal pin 42 extending through the cylindrical pads and journalling arm 24 and trackway 26 together for relative rotation therebetween. The arm and trackway may be lodked together against relative movement simply by turning lever 44 which draws pads 38 and 40 tightly together in a known manner.

The carriage and tool holding assembly 16 includes carriage 46 having an upper portion 48 reciprocably mounted along trackway 26 by any conventional means, such as the cooperating roller and groove structure 50, with the carriage being lockable at any location along track 26 by a conventional locking device 52.

Upper carriage portion 48 has at its lower end a cylindrical mounting pad 54 which mates with a cylindrical mounting pad 56 on the lower carriage portion 58, with pads 54 and 56 being journalled together for relative rotation by journal pin 60. When desired, the pads may be drawn tightly together to prevent relative movement therebetween by turning locking device 62 which suitably moves journal pin 60 to a locking position through the use of any suitable conventional drive connection such as a helical gear connection or cooperating cam assembly.

Lower carriage portion 58 includes an internal longitudinally threaded bore 64 and a lower horizontal bore 66 of generally rectangular cross section cut out at its lower end to form a slot 68 across the bottom of carriage portion 58.

A tool holding frame 70 is supported from carriage portion 58 and includes a first tubular open ended rectangular bar 72 slidably mounted in bore 66, a second rectangular bar 74 telescopically slidably fitting within tubular bar 72, with bar 72 having a bottom slot 76 extending from one free end to a location short of its other end from which a tool supporting bracket 78 is suspended from the free end of bar 74.

Bars 72 and 74 are thus slidably adjustable relative to each other ot vary the spacing between support brackets 78 and 80, with a set screw 82 extending upwardly through slots 68 and 76 and bar 74 into engagement with the upper wall of bar 72 to lock the bars against relative movement, and hence provide a fixed spacing between support brackets 78 and 80.

The entire tool holding frame 70 may be moved horizontally relative to carriage portion 58 by rotation of feed screw 84 rotatably connected to the ends of arm 72 and extending through the threaded bore 64.

Each of the tool support brackets 78 and 80 includes a downwardly extending fork 86 and an inverted T-shaped member 88 connected to the bottom ends thereof, with member 88 providing horizontal tool base supporting lips 90 and a vertical web portion 92 having openings 94 to receive tool clamping screw jigs 96. As shown, for example, in FIG. 1, jigs 96 securely clamp the base plate of a conventional sabre saw to lips 90.

From the above detailed description, it is apparent that the invention provides a highly versatile radial arm saw with which any type portable cutting tool may be employed to produce cuts of various shapes and dimentions as desired by the operator. For example, straight linear cuts may be produced by moving the entire carriage and tool holding assembly along trackway 26 while the arm 24 is locked to arm 24, and the upper and lower portions of the carriage 46 are locked together. A linear cut may also be provided merely by moving the tool holding frame 70 relative to carriage 46 by rotation of the feed screw 84, while all other relatively movable elements are held stationary.

Circular cuts of various diameters may be provided in several ways. The arm 24 and entire carriage assembly 16 may be rotated about the upper end of column 18 to give a circular cut of very large dimensions. Alternatively, with support arm 24 fixed to the column 18, trackway 26 may be rotated about journal pin 42 to produce a circular cut. Similarly, with arm 24 and track 26 fixed the upper and lower portions of carriage 46 may be relatively rotated to provide a circular cut. In addition, as espedially illustrated in FIG. 2, since the bar 74 may be inserted in either of the open ends of tubular bar 72, the cutting tool may be supported at various given radii from the axis of rotation of journal pin 60, and hence provide circular cuts of any desired dimentions.

Because of its versatility, the radial arm saw is highly useful and advantageous since it is readily adaptable for employment with various type portable hand power saws such as a circular saw (FIG. 4) and routers (FIG. 5) and is especially appealing to persons such as hobbiests and homeowners who often find it necessary to adapt their portable hand tools for various type jobs.

What I claim is:

1. A radial arm machine for supporting a portable power tool comprising an upstanding support column, a laterally projecting support arm on said column, laterally extending track means pivotally mounted on said arm, a carriage mounted on said track means for longitudinal sliding movement therealong, tool holding means connected to said carriage for detachably mounting thereon a normally manually manipulatable portable power tool, said tool holding means including releaseable clamp means which enables a plurality of various types of portable power tools to be quickly and easily mounted on and removed from said tool holding means, and means associated with said carriage capable of effecting linear movement of said tool holding means with respect to the carriage during the cutting operation.

2. The combination of claim 1 wherein said portable power tool is a sabre saw.

3. The combination of claim 1 wherein said portable power tool is a circular saw.

4. The combination of claim 1 wherein said portable power tool is a router.

5. A radial arm power tool machine comprising an upstanding support column, a laterally projecting arm on said column, laterally extending track means rotatably mounted on said arm, a carriage mounted on said track means for longitudinal sliding movement therealong, a power driven tool mounted on said carriage and moveable therewith, and means associated with said carriage for moving said tool linearly with respect to said carriage.

6. The combination of claim 5 wherein said tool is a router and said means associated with said carriage for moving said tool linearly with respect to said carriage causes said router to be moved in a direction that is normal to the axis of rotation of the router cutter.

7. The machine of claim 5, wherein said power tool is a sabre saw.

8. The machine of claim 5, wherein said power tool is a circular saw.

9. A radial arm machine for supporting a power driven tool comprising an upstanding support, laterally projecting support means on said upstanding support, a carriage mounted on said support means for longitudinal sliding movement therealong, tool holding means for mounting a power driven tool, and adjustable means connecting said tool holding means to said carriage for moving said tool linearly with respect to said carriage in a plane substantially parallel to the plane of said support means.

10. The machine of claim 9 wherein said tool is a router and said adjustable means causes said router to be moved in a direction that is normal to the axis of rotation of the router cutter.

11. The machine of claim 9, wherein said power tool is a sabre saw.

12. The machine of claim 9, wherein said tool is a circular saw.

13. A radial arm machine for supporting a power tool comprising an upright support column, a laterally projecting support arm rotatably mounted on said support column, laterally extending track means rotatably mounted on said support arm, a carriage having an upper portion mounted on said track means for reciprocable movement therealong and a lower portion rotatable relative to said upper portion, a tool holding frame connected to said lower portion and including adjustable means for moving said tool linearly with respect to said carriage to position said tool relative to the axis of rotation of said lower portion as desired.

14. A radial arm machine as defined in claim 13, said tool holding frame comprising a first tubular member slidably mounted in said lower portion, a second member slidably mounted in said first member, tool supporting brackets connected to the free ends of said first and second members with the spacing between said brackets being varied by moving said first and second members relative to each other, said adjustable means connected between said first member and said lower portion to move said first member and said tool laterally relative to said lower portion.

15. A radial arm machine comprising support means, a laterally projecting support arm connected to said support means, a carriage mounted on said support arm for sliding movement therealong, tool holding means having releasable clamp means for detachably mounting a normally manually manipulatable portable power tool, said tool holding means being so constructed and arranged to enable a plurality of different types of portable power tools to be quickly and easily mounted on and removed from said machine, and adjustable means connecting said tool holding means to said carriage for moving said tool linearly with respect to said carriage in a plane substantially parallel to the plane of said support arm.

16. The machine of claim 15, said tool holding means including a plurality of clamp members laterally spaced from each other, and an opening between said clamp members through which the cutting tool of a portable power tool may extend toward a workpiece to be cut.

17. The machine of claim 16, wherein a sabre saw is mounted on said tool holding means.

18. The machine of claim 16, wherein a circular saw is mounted on said tool holding means.

19. The machine of claim 16, wherein a router is mounted on said tool holding means.

* * * * *